UNITED STATES PATENT OFFICE.

CHARLES D. BIRDSEYE, OF NEW YORK, N. Y.

IMPROVEMENT IN THE PROCESS OF PREPARING CREAM.

Specification forming part of Letters Patent No. 7,644, dated September 17, 1850.

*To all whom it may concern:*

Be it known that I, CHAS. DENISON BIRDS-EYE, of the city, county, and State of New York, have invented a new Composition called "Cream-Sugar," being an improved method for preserving all the flavor and valuable nutricious qualities of milk for a great length of time in a convenient and portable form for use.

The nature of my invention and improvement consists in placing a quantity of pure milk in a vessel which is placed in a vapor bath, said vessel having a close cover with a pipe attached, which shall convey the steam and flavor arising from the evaporation of the milk through another vessel containing sugar, thereby preserving the pure flavor of the milk, the evaporation to be continued until the quantity is reduced about one-half, when the sugar is to be mixed in the milk and the evaporation continued in an open vessel (the same being constantly stirred) until the whole becomes granulated, when it is dried sufficient to be reduced to a powder. The quantity of the sugar may be varied as desired. The sugar which has absorbed and holds the flavor of the milk will still retain that flavor when it is united with the remainder of the milk, which has been thus partially evaporated; and during the slight evaporation necessary to complete the process little or none of the flavor will pass off, being held by its thorough union with the saccharine matter.

Sugar may be mixed with milk in the first place and the whole evaporated to a solid; but the result will be an article far inferior in flavor and quality to that made by the process I have specified, besides the process of evaporation would be so slow as to be entirely impracticable in the manufacture of an article for general use, as time and fuel would form very important items in the expense, and abundant experience has proved that the article is not so good. This process has the advantage of rapid evaporation of the milk till it is considerably reduced, at the same time allowing the steam from the milk to pass through the sugar, which sugar retains the flavor, allowing only the insipid vapor to pass. The impregnated sugar being then added to the remainder of the milk, and the evaporation continued, the whole is soon reduced to a solid mass, which can be then powdered and preserved in suitable vessels for use on long voyages and in any climate.

What I claim as my invention, and desire to secure by Letters Patent, is—

The process described herein of distilling milk and condensing the same in sugar for the purpose of preserving the flavor, as set forth.

CHARLES DENISON BIRDSEYE.

In presence of—
B. D. CLARK,
A. M. COTTER.